United States Patent [19]
Hale

[11] Patent Number: 6,119,442
[45] Date of Patent: Sep. 19, 2000

[54] COMBINE SETTING AUTOADJUST WITH MACHINE VISION

[75] Inventor: George H. Hale, Naperville, Ill.

[73] Assignee: Case Corporation, Racine, Wis.

[21] Appl. No.: 09/312,549

[22] Filed: May 14, 1999

[51] Int. Cl.[7] .............................. A01D 41/12; B62D 5/00; A01C 15/00
[52] U.S. Cl. .................................... 56/10.2 H; 56/10.2 R
[58] Field of Search ............................ 56/10.2 R, 10.2 E, 56/10.2 F, 10.2 G, 10.2 H, 16.4 R, 16.4 A, 16.4 B; 364/424.07; 460/1; 172/2, 4, 4.5, 7

[56] References Cited

U.S. PATENT DOCUMENTS

| | | | |
|---|---|---|---|
| 4,038,810 | 8/1977 | Williams et al. | 56/220 |
| 4,091,602 | 5/1978 | Williams et al. | 56/14.4 |
| 4,130,980 | 12/1978 | Fardal et al. | |
| 4,259,829 | 4/1981 | Strubbe . | |
| 4,296,409 | 10/1981 | Whitaker et al. | |
| 4,337,611 | 7/1982 | Mailander et al. | |
| 4,348,855 | 9/1982 | DePauw et al. | |
| 4,376,298 | 3/1983 | Sokol et al. | |
| 4,466,230 | 8/1984 | Osselaere et al. | |
| 4,513,562 | 4/1985 | Strubbe . | |
| 4,527,241 | 7/1985 | Sheehan et al. | |
| 4,548,027 | 10/1985 | Maeoka . | |
| 4,747,301 | 5/1988 | Bellanger . | |
| 4,893,241 | 1/1990 | Girodat et al. | |
| 4,934,985 | 6/1990 | Strubbe . | |
| 4,967,544 | 11/1990 | Ziegler et al. | |
| 5,463,854 | 11/1995 | Chmielewski, Jr. et al. | |
| 5,488,817 | 2/1996 | Paquet et al. | |
| 5,489,239 | 2/1996 | Matousek et al. | |
| 5,666,793 | 9/1997 | Bottinger . | |
| 5,715,666 | 2/1998 | Huster et al. | 56/10.2 F |
| 5,873,227 | 2/1999 | Arner | 56/14.6 |

FOREIGN PATENT DOCUMENTS

| | | |
|---|---|---|
| 42 23 585 A1 | 1/1994 | Germany . |
| 2 155 666 | 9/1985 | United Kingdom . |
| WO 86/05353 | 9/1986 | WIPO . |
| WO 95/16225 | 6/1995 | WIPO . |

OTHER PUBLICATIONS

"Control System for Combine Harvesters"; Kotyk et al.; pp. 96–102; [Date and Publication Unknown].

"Investigation of a Feedrate Sensor for Combine Harvesters"; Klassen et al.; SAE Technical Paper 932428; Presented at 1993 International Off–Highway & Powerplant Congress & Exposition, Milwaukee, Wisconsin, Sep. 13–15, 1993.

"Using DGPS to Improve Corn Production and Water Quality"; Blackmer et al.; GPS World (Mar. 1996); pp. 44–52.

*Primary Examiner*—Robert E. Pezzuto
*Attorney, Agent, or Firm*—Foley & Lardner

[57] ABSTRACT

A combine for processing crop materials includes a frame, a main body, ground support devices, a device for propelling the combine at a ground speed, an operator's station, a header including a reel rotatable at a reel speed, a feeder portion including a conveyor movable at a feeder speed, a threshing portion including a rotor rotatable at a rotor speed, a grain cleaning portion including a cleaning air fan rotatable at a cleaning air fan speed with adjustable outlet restrictions, and chaffer and grain sieves. An instrument and control system, which includes a data processing unit (DPU), a memory apparatus, an input device, an actuator, and a machine vision apparatus, monitors processing of crop materials and automatically adjusts combine settings in response thereto. A method of controlling the operations of a combine includes (a) viewing crop materials with a machine vision apparatus, (b) generating an image signal corresponding to an image of the crop materials, (c) transmitting the image signal to a DPU, (d) comparing the image signal to a setpoint within the DPU and generating an output signal corresponding to the difference therebetween, and (e) transmitting the output signal to an actuator configured to change a combine setting.

31 Claims, 5 Drawing Sheets

COMBINE SETTING AUTOADJUST WITH MACHINE VISION

FIELD OF THE INVENTION

The present invention relates generally to agricultural combines. In particular, the present invention relates to a combine including a control system for automatically adjusting settings of various crop processing systems of the combine in response to crop image signals generated by a machine vision apparatus.

BACKGROUND OF THE INVENTION

Agricultural combine are used to harvest grain (e.g., wheat, corn, barley, etc.) from plants growing upon an agricultural field. Combines combine the harvesting operations of reaping, gathering, threshing, and winnowing, or cleaning, which, in earlier years, were separately performed; hence, the name "combine".

A combine typically includes a frame, a main body supported thereby, and ground support devices such as wheels and/or crawler treads to support the frame upon the surface of a field. A combine may be an implement towed and steered by a vehicle such as a tractor and having internal crop processing devices powered by a power takeoff (PTO) shaft associated with the tractor, or it may itself be a vehicle powered by an on-board engine, or other prime mover, wherein at least some of the ground support devices are controllably steerable to guide the combine over the field.

In either event, combines generally include a reaping portion (i.e., a header) attached to the front thereof for cutting, snapping or otherwise severing the crop plant stalk near the soil surface and gathering the cut plants or crop material for additional processing operations. The header is generally relatively wide such that a plurality of rows of crop may be harvested simultaneously, and typically is configured to transversely convey the crop materials toward the transverse center of the combine. A feed conveyor or feeder receives the crop material from the header and conveys the material rearwardly into a chamber inside the main body for additional processing.

The chamber includes a threshing portion or thresher which receives crop material from the feeder at an inlet end and removes kernels of grain from the received material to separate the grain from non-grain materials (i.e., "trash") such as stalks, straw, husks, cobs, etc. The thresher includes a generally cylindrical rotating member, or rotor, rotating within a generally cylindrical static casing, or rotor cage.

A combine is generally configured with a thresher with a rotor axis of rotation either horizontally and transversely disposed (i.e., a "conventional" thresher) or horizontally and longitudinally disposed (i.e., an "axial flow" thresher). Axial flow threshers have a forwardly disposed inlet end and a rearwardly disposed outlet end, with the outlet end generally being disposed slightly higher than the inlet end. Examples of combines having axial flow threshers are models within the 2300 Series of Axial-Flow™ combines produced by Case Corporation of WI, the assignee of the present application. The present invention is equally applicable, however, to combines which are configured with either conventional or axial flow threshers.

The rotor has a ribbed outer surface and a fixed radius, while the rotor cage has a vaned inner surface. At least some of the rotor cage's vanes are spirally configured such that rotation of the rotor within the rotor cage transports the crop materials rearwardly as well as circumferentially. The rotor cage has a significantly larger inside diameter than the rotor's outside diameter, so that a large rotor cage gap exists between the rotor's outer surface and the rotor cage's inner surface. A lower portion of this rotor cage gap contains an arcuate and perforated device known as a "concave", spaced apart from the rotor by a concave gap smaller than the rotor cage gap. The concave gap may be adjusted by changing the radius of the concave for differing crops, crop moisture levels, and other varying conditions. The perforated concave has a plurality of apertures of a size slightly larger than that of a kernel of the grain being harvested so that kernels freed from the trash may fall by gravity out of the thresher into a collecting grain pan beneath the concave. Most of the threshing action occurs within the concave gap. The concave includes a plurality of concave sections, and may also include at least one additional rearwardly disposed perforated member or "grate". Collectively, the assemblage of individual concave sections and, if present, grate sections, is referred to as a concave.

While dust and small bits of trash fall through the apertures into the grain pan with the grain, most of the trash is too large to fall through the apertures and thus continues being transported rearwardly through the thresher to exit via an open outlet end of the thresher. The trash is expelled from the rear of the combine by air flow from a cleaning air fan, which may be assisted by a rotating open impeller, or beater, to fall on the field surface. Incompletely threshed material, or tailings, too heavy to be blown out, fall into a chaffer sieve for deposit into a tailings pan for conveyance by a tailings conveyor to the inlet end of the thresher for re-threshing.

A conveyor, typically including at least one grain augur, runs through the grain pan and transports the grain rearwardly to a grain cleaning portion of the combine, where dust and small bits of trash entrained therewith are removed by the combined actions of at least one horizontally disposed vibrating or oscillating screen, or sieve, and air flow through and over the sieve provided by the cleaning air fan. To provide efficient operation with various types of grain and operating conditions, sieve opening sizes and cleaning air flow rates are independently adjustable, the latter by adjustment of fan speed and/or fan outlet restriction; e.g., an outlet damper.

Trash particles removed from the grain are carried out the combine by the air stream from the cleaning air fan for deposit upon the field, while the relatively heavy grain kernels fall through the sieve into a horizontally disposed cleaned grain pan. A conveyor, typically a cleaned grain augur, runs transversely through the cleaned grain pan to transport the cleaned grain to another conveyor, typically a generally vertically disposed elevator, which lifts the cleaned grain into a storage bin or grain tank which may be periodically emptied into a large truck or transfer vehicle placed alongside the combine through a horizontally disposed unloading augur.

If it is desired to use a combine configured to harvest one type of grain (e.g., wheat) to harvest another type of grain (e.g., corn), the combine must generally be reconfigured for the new crop (which may have a different structure, row spacing, and grain kernel size and mass) by substituting a different header and, in some cases, different concaves, rotor and sieves. It is then necessary to estimate the average crop yield per acre and moisture level in order to select preliminary settings for combine ground speed, header speed, feeder speed, rotor speed, concave gap, sieve oscillation frequency and amplitude, and cleaning air fan speed or outlet restriction.

To efficiently harvest the new crop, the operator closely monitors many operational parameters of the combine and makes corresponding adjustments to various settings of the combine. The adjustable settings of the combine typically include the engine speed, ground speed, header reel speed, feeder speed, rotor speed, sieve speed, cleaning air fan speed, concave gap, sieve opening size, header height, header attitude, etc. The adjustments may be made in response to the operator's own observations of crop material level within the header, load at various points of the power transmission, crop yield rates, grain loss at the rotor or sieves; flow rates of clean grain, tailings, cleaning air, and engine fuel; grain bulk quality in terms of trash and fine fracture particles in the cleaned grain; and grain kernel individual quality in terms of the extent to which grain kernels are fractured during the threshing process.

Many adjustments are interactive to varying degrees depending in part on a particular harvest's grain type, plant height, health, uniformity, moisture level, etc., and desired harvesting efficiency in terms of acceptable level of grain loss versus yield rate, engine fuel consumption rate, and the time available for harvesting a field before the combine and attendant transfer vehicles are needed at another field. Since crop characteristics vary throughout a field (e.g., due, to variation in application rates of seed, fertilizers, pesticides, herbicides, and due to soil types, nutritional levels, drainage, pitch, storm damage, etc.), the operator must continuously monitor the operational conditions of the harvest and must correspondingly adjust settings of the combine to maximize crop yield while containing the costs associated with harvesting.

Thus, it is apparent that operation of a combine requires a considerable amount of skill, close attention and diligence for long periods of time. Locating the operator's station in a sealed cab supplied with filtered and conditioned air increases operator comfort and aids the operator in concentrating on the harvesting, but also reduces the noise level within the cab which, while beneficial for the same reason, reduces the operator's ability to hear changes in the sounds of the various parts of the combine's apparatus which may otherwise alert him to changes in harvest conditions.

Recent developments have alleviated some demands placed on the combine operator while improving harvesting efficiency. Some of the developments include Global Positioning System (GPS) equipment placed on board the combine which, when combined with a suitable harvest and combine data acquisition system, reduces the need for the operator to manually record data; systems for monitoring, displaying, and recording in real time parameters such as feed rate, yield rate, grain loss rates, moisture level, grain level within the grain tank, various loads and speeds; and control systems for controlling such parameters. Such systems typically use potentiometric, capacitative, piezoelectric, variable reluctance, photoelectric and strain gage sensors. Despite advances made in throughput, efficiency, and ease of operation, however, there remains significant room for improvement.

It would be advantageous to provide an instrument and control system for a combine having machine vision apparatus and a data processing unit ("DPU"), the machine vision apparatus disposed to view crop materials being processed by the combine, generate a spectral color signal representing hue of the crop materials, and transmit the spectral color signal to the DPU, the DPU being used to chromatically analyze the image represented by the spectral color signal. It would be advantageous to place such machine vision apparatus at any of several locations on the combine to visually sense the crop materials being processed from any of the locations. It would also be advantageous to use the crop image signal produced by such machine vision apparatus as an input used for controlling settings of various crop processing systems.

SUMMARY OF THE INVENTION

The invention relates to a combine for processing crop materials. The combine has a frame, a main body supported thereby, and ground support devices. The combine includes a propulsion system to propel the combine at a ground speed, a header to gather crop materials from the field, a feeder to convey the crop materials from the header to the main body, a thresher supported by the main body for receiving the crop materials from the feeder and separating useable grain therefrom, and a cleaning portion for cleaning the useable grain. The header has a reel member rotatable at a reel speed, the feeder has a conveyor moveable at a feeder speed, the thresher has a rotor spaced apart from a concave by a gap, the rotor rotatable at a rotor speed, and the cleaning portion has a cleaning air fan rotatable at a fan speed, and also includes a chaffer sieve and a grain sieve, each having at least one aperture. An instrument and control system, which monitors conditions of processing of the crop materials and automatically adjusts settings of the combine in response to the monitored conditions, includes a machine vision apparatus disposed to view the crop materials being processed and to generate a crop image signal representative thereof, an actuator to adjust the ground speed, reel speed, feeder speed, rotor speed, fan speed and/or concave gap in response to a control signal, and a data processing unit which executes a control program to generate the control signal based at least in part on the crop image signal and to apply the control signal to the actuator so that the actuator is controlled at least in part based on the crop image signal.

Another aspect of the present invention relates to an instrument and control system for a combine, the instrument and control system configured to monitor conditions of the processing of crop materials and to automatically adjust settings of the combine in response to the monitored conditions, the instrument and control system including at least one data processing unit, at least one memory apparatus in communication with the data processing unit, at least one operator input device in communication with the data processing unit, at least one actuator in communication with the data processing unit, and at least one machine vision apparatus in communication with the data processing unit.

Another aspect of the present invention relates to a method of controlling operation of an agricultural combine harvester, or combine, which is provided with an instrument and control system, the method including the steps of (a) viewing the crop materials with at least one machine vision apparatus of the instrument and control system (b) generating an image signal corresponding to the image of the view crop materials (c) transmitting the image signal from the machine vision apparatus to at least one data processing unit of the instrument and control system, the data processing unit in communication with the machine vision apparatus; (d) comparing the image signal with a setpoint signal within the data processing unit and generating an output signal corresponding to the difference between the image signal and the setpoint signal; and (e) transmitting the output signal to at least one actuator of the instrument and control system, the actuator in communication with the data processing unit, the actuator configured to change a setting of the combine.

DESCRIPTION OF THE DRAWINGS

A full understanding of the invention may be gained from the Drawings taken in conjunction with the Detailed Description, wherein like reference numerals refer to like parts.

DETAILED DESCRIPTION OF EXEMPLARY EMBODIMENTS

Figure 1:
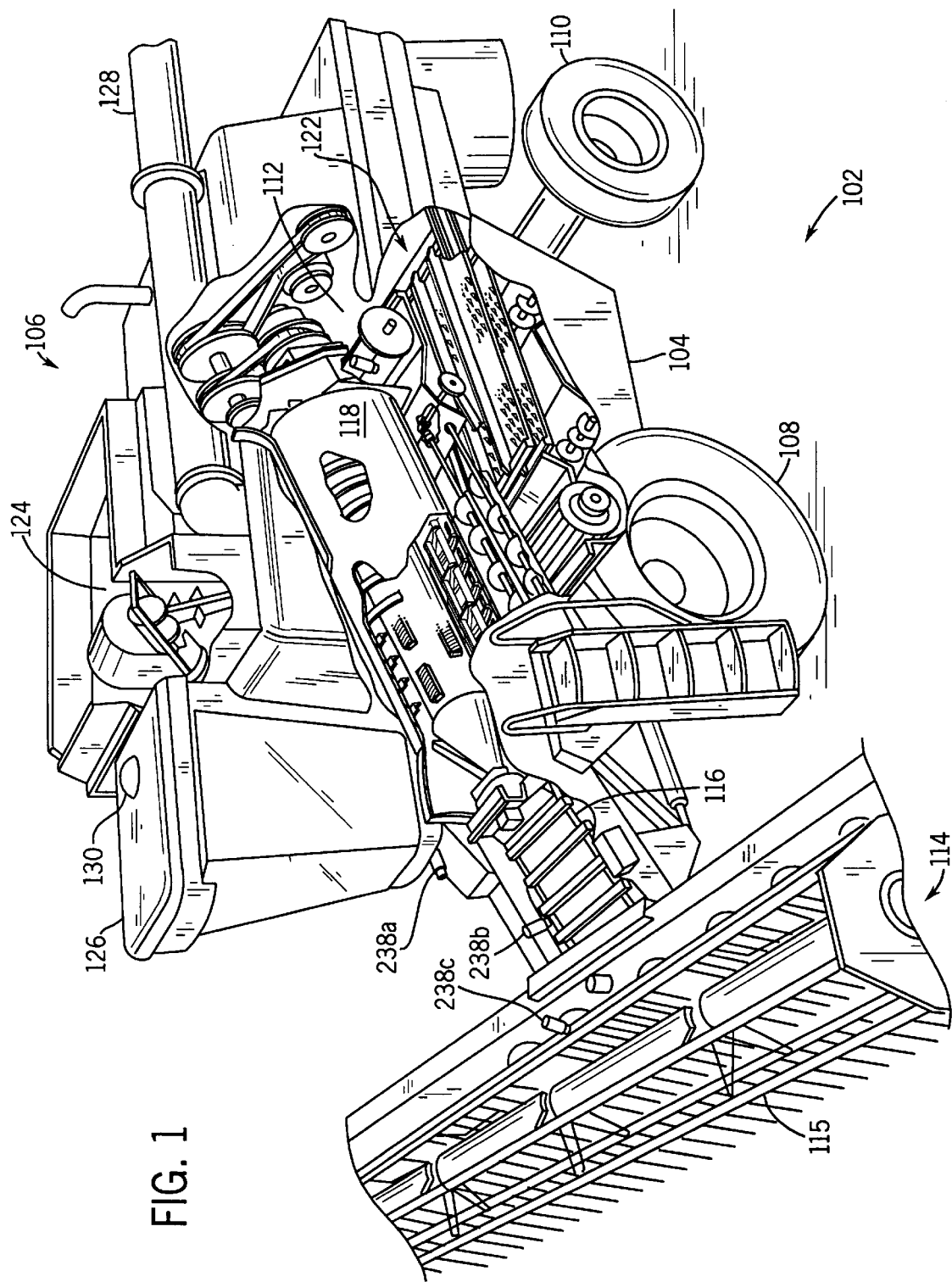
FIG. 1 is a perspective view, partially broken away, of an agricultural combine provided with at least one machine vision apparatus.

FIG. 1 shows an agricultural combine harvester depicted as a self-propelled combine 102. Alternatively, the term "combine" is also to be construed as applying to a combine configured as an implement adapted to be connected to, pulled by, guided (i.e., steered) and powered by another work vehicle such as a tractor.

Combine 102 is configured as an agricultural work vehicle having a frame 104, a main body 106 with a grain tank 124 installed on frame 104, an engine or other prime mover (not shown) mounted on frame 104, front ground support devices (e.g., drive wheels 108 connected to the engine for moving combine 102 at a particular and controllable ground speed across the surface of an agricultural field or a road), rear ground support devices (e.g., steerable wheels 110 which may also be connected to the engine for additional traction), and an operator's station 126.

Combine 102 is further configured to harvest a crop growing upon a field using a crop reaping apparatus such as a header 114 having a particular width to harvest crop in a swath of a substantially similar width. Header 114 severs (e.g., cuts or snaps) plants located within the swath as combine 102 moves across the field, and conveys the plants, or crop material, to a central region of the header. Header 114 is generally configured to reap a particular type crop, and thus is easily removed from and attached to frame 104 and main body 106 such that combine 102 may be used to harvest a different type of crop by substitution of an appropriate header therefore. Header 114 includes a movable member, shown as a rotatable reel 115, for severing and gathering crop materials. The rotational speed of reel 115 is typically maintained in approximate correspondence with ground speed of combine 102 since the ground speed determines the rate at which crop is encountered and therefore the rate of crop harvesting. Combine 102 is configured to lower header 114 to an operating position for engaging crop and to raise header 114 to a transport position during transport.

Combine 102 also includes a feed conveyor or feeder 116, which receives crop material from a central region of header 114 associated with the central front portion of main body 106, and conveys the material at a controllably adjustable feed rate to a chamber 112 within main body 106. Briefly referring to FIG. 2, a threshing apparatus or thresher 118 is located within chamber 112 for separating the crop materials to be harvested (e.g., kernels of grain, or "grain") from crop materials other than grain (e.g., stalk materials, husks, chaff, and dust, collectively "trash"). Thresher 118 is an apparatus having a generally cylindrical rotor 134 rotatable within a generally cylindrical and coaxial rotor cage 136. The inside diameter of rotor cage 136 is considerably larger than the outside diameter of rotor 134. A substantial annular rotor cage gap 146 therefore exists between rotor 134 and rotor cage 136. A concave 138 is installed in a lower portion of the rotor cage gap 146.

Figure 4:
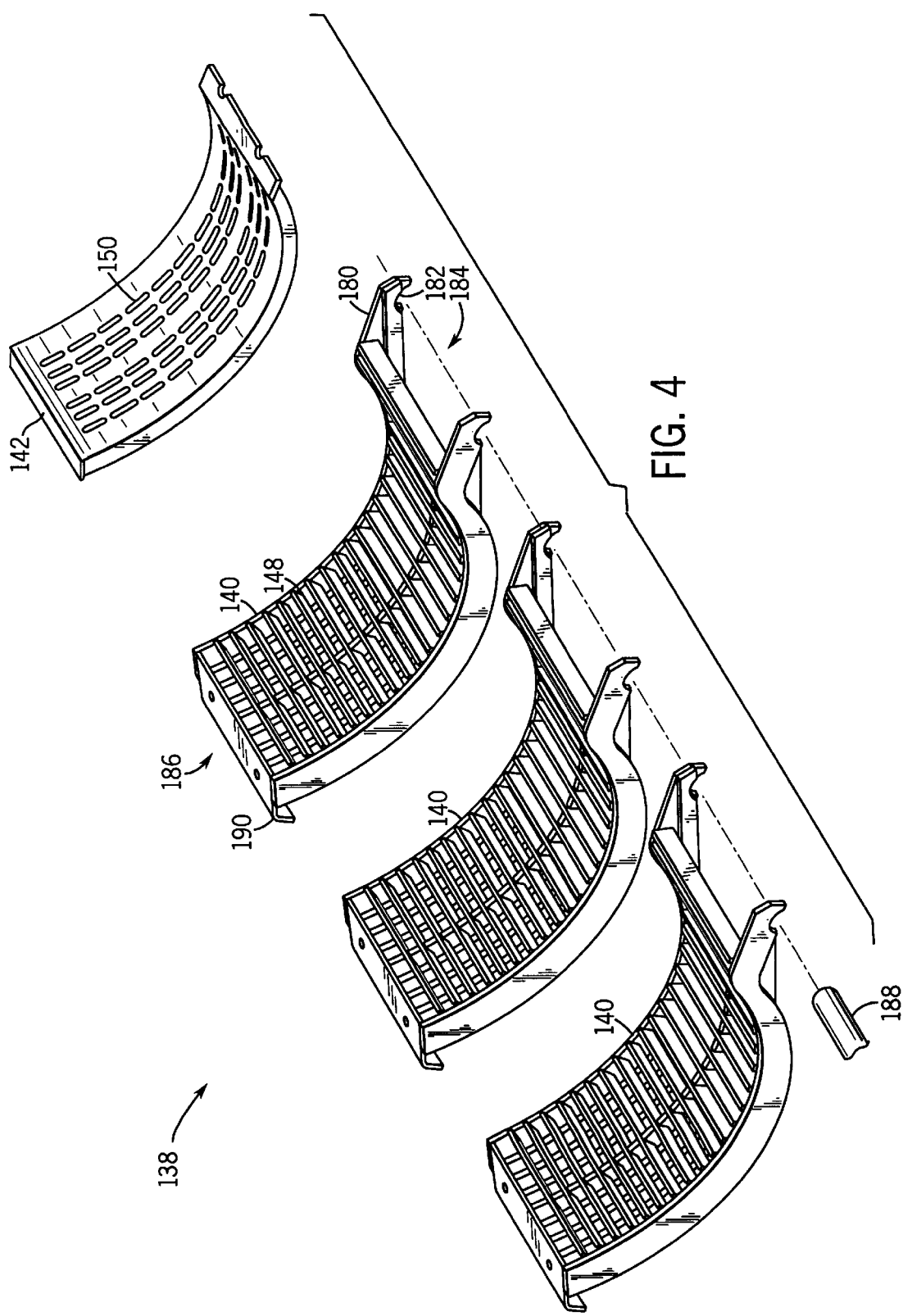
FIG. 4 is an exploded perspective view of a portion of the combine.

Briefly referring to FIG. 4, concave 138 includes a plurality of individual concave sections 140 and individual grate sections 142. Concave 138 is generally arcuate in shape and is provided with a plurality of concave apertures 148 penetrating the walls of concave sections 140 and grate apertures 150 penetrating the walls of grate sections 142. Concave 138 has a length generally similar to the axial length of rotor 134 and an inside radius larger than the outside radius of rotor 134. At least concave sections 140 of concave 138 are radially adjustable in position with respect to the outer diameter of rotor 134, so that a concave gap exists between the outside diameter, or radius, of rotor 134 and so that the inside radius of at least a portion of concave 138 is adjustable in size.

Returning to FIGS. 1 and 5, combine 102 includes an instrument and control system 202 for monitoring conditions of the crop materials being processed and for adjusting settings of combine 102 in response to the monitored conditions. Instrument and control system 202 includes machine vision apparatus with at least one material image sensor 238 for generating a crop image signal. Material image sensor 238 may be placed in any of a number of locations about combine 102 to view crop materials at different processing stages. Thus, material image sensor 238 may be a standing crop image sensor 238a disposed to view standing crop in the travel path of combine 102. Standing crop image sensor 238a is fixedly mounted to main body 106. Alternatively, the height of standing crop image sensor 238a can be adjusted by the operator with respect to main body 106 to view the foliage of various types of crop having differing heights despite headers 114 having differing configurations and being disposed in both lowered and raised positions. Standing crop image sensor 238a may be configured to sense coloration, or hue, of vegetation within the standing crop.

Figure 5:
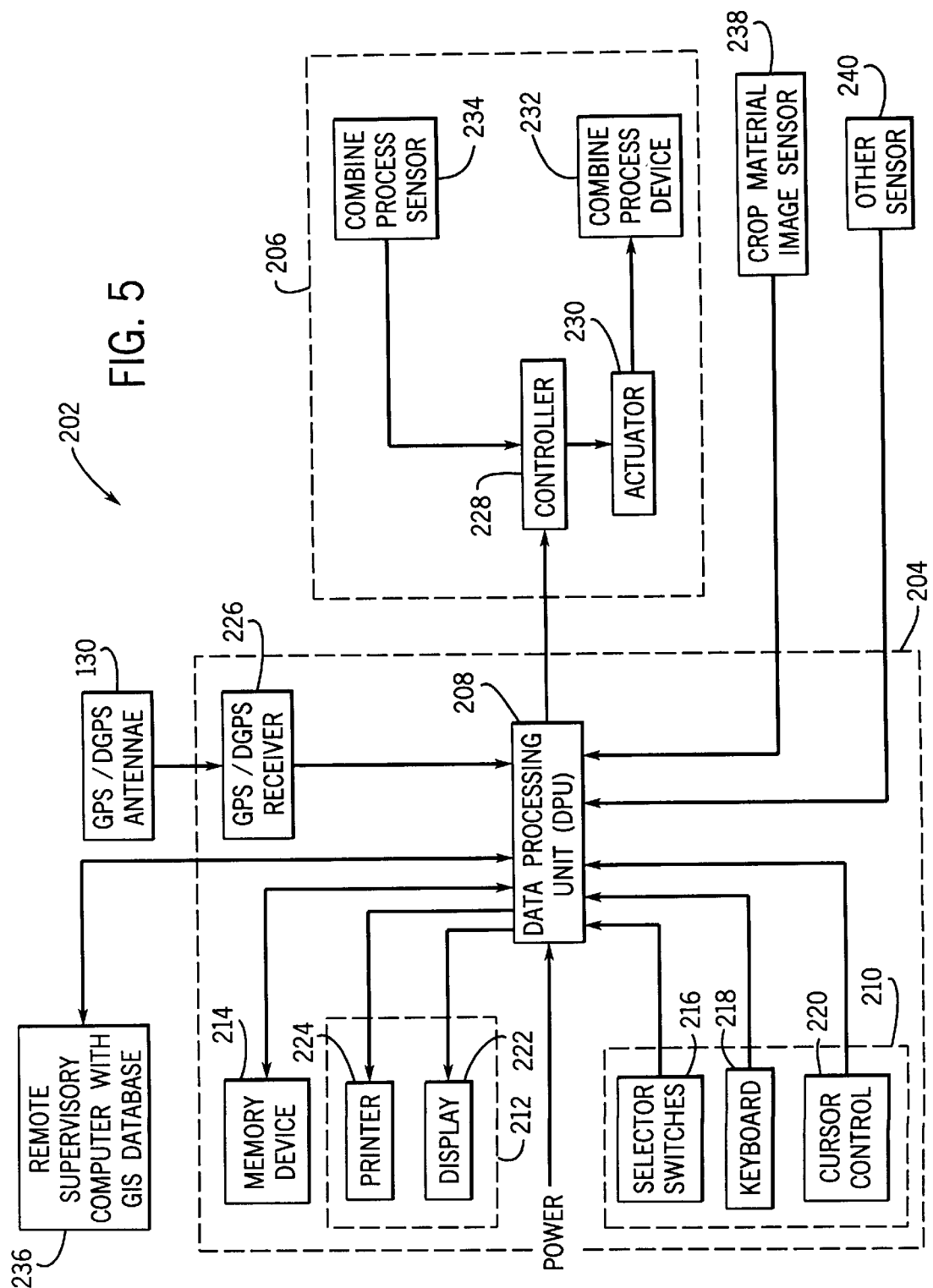
FIG. 5 is a block diagram of an instrumentation and control system for the combine.

Crop protein content, nitrogen content, chlorophyll content, and other crop parameters are known to be related to hue for many crops. Referring to FIG. 5, standing crop image sensor 238a may be configured to distinguish hues, to generate standing crop image signals corresponding at least in part to the hues, and to transmit the standing crop image signal to a data processing unit (DPU) 208. DPU 208 may be configured, by executing a program stored in a memory apparatus 214, to look up corresponding constituent levels in a database also stored in memory apparatus 214 and to generate constituent signals corresponding to the constituent levels. The constituent signals may be displayed, printed and/or stored in a portion of apparatus 214 configured as a portable memory device (e.g., a diskette or a memory card) in correlation with corresponding locational identification obtained by DPU 208 from a (Differential) Global Positioning System (DGPS/GPS) receiver 226 and antennae 130. The correlated data can then be entered into a Geographic Information System (GIS) database in a remote computer 236. Alternatively, the correlated data can be transmitted in real time via a wireless datalink to remote computer 236.

Image sensors for viewing reflected light in the near-infrared (NIR) spectra have been found to be suitable for crop material hue and shade discrimination. Machine vision apparatus are available in single-point and multi-point configurations. Single-point systems are available packaged within a compact image sensor housing, with embedded microprocessor-based image analysis and network communication electronics, requiring only connections for power input and signal output and allowing instrument and control system 202 to include distributed intelligence for reducing the demands upon a central DPU. Multi-point systems are available with a central vision processor unit including processor and coprocessor for image analysis and networking of up to 16 single-point image sensors, also reducing demands upon a central DPU. Instrument and control system 202 may also include smart sensors (i.e., sensors with an embedded microprocessor). DPU 208 may thus be configured as a single data processing unit or as a plurality of networked data processing units.

Crop image sensor 238 may also be mounted at other locations on combine 102, and more than one sensor 238 may be employed. For example, FIG. 1 also shows a feeder cut crop image sensor 238b located and disposed to view crop materials being conveyed from header 114 to thresher 118. Feeder cut crop image sensor 238b generates a cut crop image signal and transmits this signal to DPU 208 for evaluation of the flow rate of the cut crop material being conveyed and for corresponding adjustment of a combine processing device 232 as described below. Feeder cut crop image sensor 238b may also be configured to discern an average hue of the crop material being conveyed, generate a signal representative thereof, and transmit the hue signal to DPU 208 for generation and display, or storing of a constituent level signal as described above.

For another example, instrument and control system 202 may include a header crop image sensor 238c which is located and disposed to view crop materials substantially before and/or within header 114. Header crop image sensor 238c may discern an average hue of the crop material before and/or within header 114, generate a signal representative of the hue, and transmit the hue signal to DPU 208 for generation and display, or storing of a constituent level signal as described above.

Figure 2:
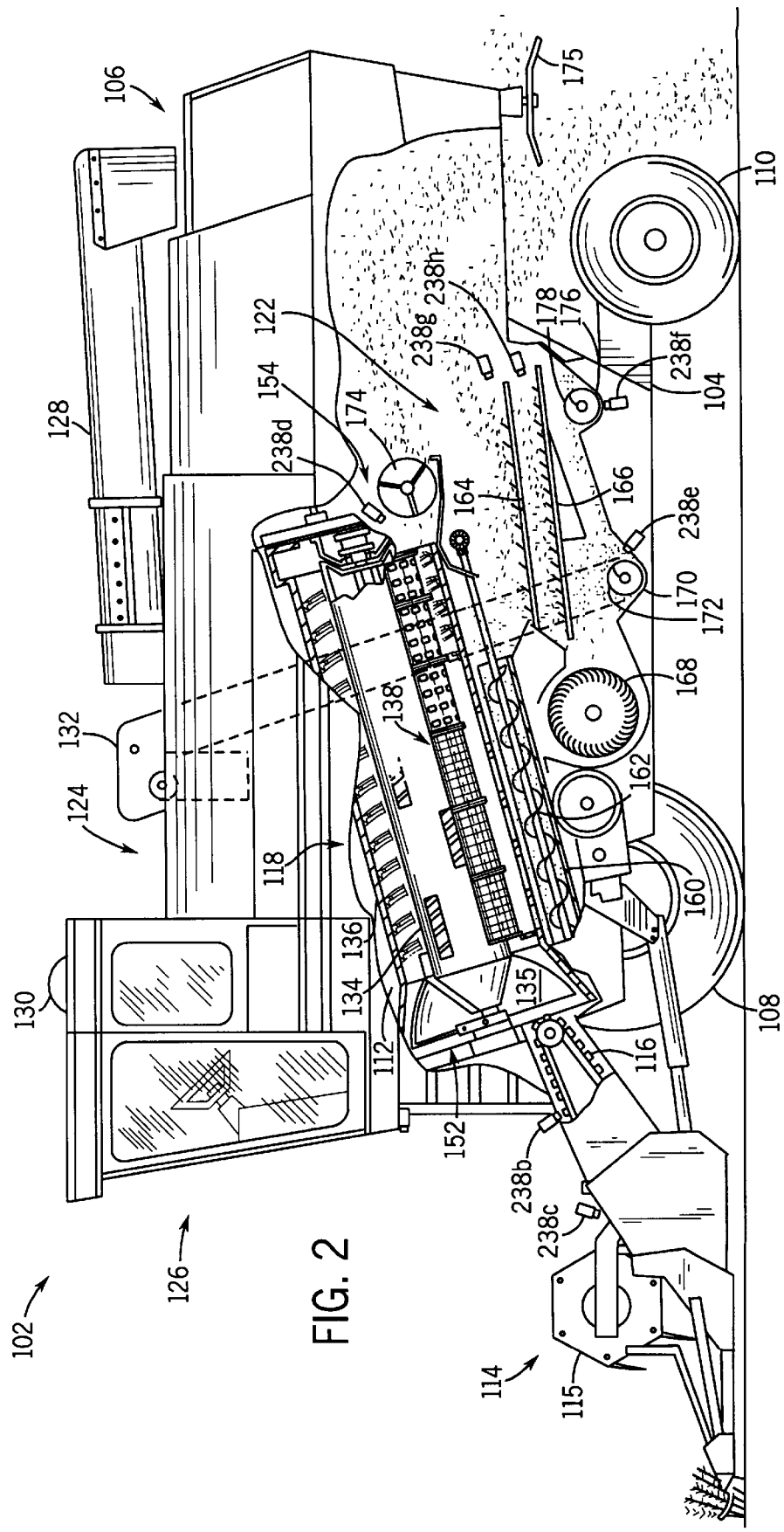
FIG. 2 is a side elevation view, in partial section, of the combine.

Referring to FIG. 2, the outer surface of rotor 134 is provided with bars, vanes, blades or other projections (e.g., rasp bars 156) which cause generally circumferential movement of crop materials between rotor 134 and concave 138, and generally spiral movement between rotor 134 and rotor cage 136. Depending on the type of grain and the condition of the crop materials (e.g., stalk and kernel sizes, moisture levels, degree of ripeness), concave gap 144 may be adjusted to a smaller or larger size to provide greater or lesser aggressiveness, respectively, of the tumbling, rolling, and rubbing motions imparted to the crop materials by rotation of rotor 134 with respect to concave 138 in order to substantially completely remove the grain kernels from the plant materials upon which they grew, and to which they adhere, while not overstressing the kernels to the point that an excessive number of them fracture during the threshing process.

The rotational speed of rotor 134 is typically maintained high enough (e.g., 500 rpm) to impart a significant centrifugal acceleration to each grain kernel and thereby assist in separating it from other crop materials and passing it through concave apertures 148 and grate apertures 150 (FIG. 4) of concave 138. Concave and grate apertures 148 and 150 are sized slightly larger that the size of a kernel of the grain being harvested, so that kernels of grain may pass therethrough while the majority of trash, which is larger than the grain kernels, may not. Centrifugal acceleration of the crop materials against spirally configured vanes 158 affixed to the inner surface of rotor cage 136 causes motion of the crop material to have an axial, as well as a circumferential, component, so that crop materials are transported from an inlet end 152 to an outlet end 154 of thresher 118 during the course of their undergoing at least several revolutions within thresher 118. Combine 102 settings are adjusted so that most of the crop materials which reach, and exit, outlet end 154 are trash from which substantially all grain has been removed.

Grain largely separated from other plant materials, or trash, but still entrained with dust and small bits of chaff, or fines, collects in a grain pan 160 located beneath concave 138. At least one augur 162 within grain pan 160 conveys the grain to a cleaning portion 122 of combine 102. Trash, comprising relatively low-density material such as straw, stalk particles and fibers, husks, and chaff, is propelled out outlet end 154 by the combined actions of rasp bars 156 driving the trash along spiral vanes 158 within rotor cage 136, displacement by incoming crop materials, and movement of air caused by fan blades 135 affixed to the inlet end of rotor 134. A cleaning air fan 168 blows air upwardly through at least one chaffer sieve 164 and at least one grain sieve 166, and past outlet end 154 of thresher 118 to carry the low-density trash to an opening in the rear of combine 102, where the trash falls to the soil. A rotary beater 174 may be included to assist in moving trash away from outlet end 154 of thresher 118, and one or more trash spreaders 175 may assist in evenly distributing the trash upon the surface of the field.

Incompletely threshed portions of crop material, or the tailings, are of generally higher density than the trash and are too heavy to be blown out the opening in the rear of combine 102. Thus, the tailings fall by gravity to a tailings trough 176. A tailings conveyor 178 carries tailings from trough 176 back to inlet end 152 of thresher 118, so that the tailings may be re-threshed and residual grain recovered.

Cleaning portion 122 includes at least one chaffer sieve 164, at least one grain sieve 166, and cleaning air fan 168. Chaffer sieve 164 and grain sieve 166, generally rectangularly and horizontally disposed, have openings adjustable in size to allow substantially only objects the size of grain kernels or smaller to fall through as they move in an oscillatory manner. The oscillations are rapid and asymmetrical, so that material lying thereon is tossed generally rearwardly; i.e., rearward accelerations of chaffer sieve 164 and grain sieve 166 are greater than their forward accelerations. To maintain a crop material dwell time on sieves 164, 166 sufficient for separation of grain from fines, either or both chaffer sieve 164 and grain sieve 166 may be slightly inclined so that their front ends are below their rear ends (i.e., such that rearward movement of crop materials upon them is not accelerated by gravity). The oscillatory motion also has a vertical component to at least partially unweight the crop materials repeatedly and thereby assist airflow from cleaning air fan 168, which is directed through sieves 164 and 166 to blow lighter fines from the sieves and out the rear of combine 102 while allowing heavier grain kernels to fall by gravity, into a cleaned grain trough 170. Cleaned grain is conveyed from trough 170 by a cleaned grain augur 172 to an elevator conveyor 132 which lifts the cleaned grain to grain tank 124.

FIG. 2 shows additional image sensors which may also be used in automatically controlling the settings of combine 102. A trash image sensor 238d located near outlet end 154 of thresher 118 is disposed to view the materials exiting outlet end 154 before such materials encounter beater 174 and while they still have a relatively low velocity and are more readily imaged. Sensor 238d generates a trash image signal transmitted to DPU 208, which is programmed by software within memory apparatus 214 to distinguish kernels of loose grain within the trash image and to quantify their presence in terms of grain loss at thresher 118. An excessive presence of loose grain kernels in the trash may indicate that threshing action was aggressive enough to detach grain from other crop materials, but that the grain did not pass through concave apertures 148 or grate apertures 150, typically due to excessive vegetative material covering too many of apertures 148 and 150; i.e., overloading of thresher 118. DPU 208 is programmed to change the setpoint of a combine 102 ground speed controller (shown generally as controller 228 in FIG. 5) in response, and thereby to cause a reduction in the loading of thresher 118.

Combine 102 may also include other machine vision image sensors for improving efficiency and quality of harvest. A cleaned grain image sensor 238e, for example, may be located and disposed to view cleaned grain at grain tank 124, at elevator conveyor 132, or (as shown) at cleaned grain trough 170. The image may be displayed in a closed-circuit television (CCTV) apparatus for the operator to visually monitor for a presence of fractured grain kernels or other fines in the cleaned grain, thereby allowing the operator to change settings on the combine without having to periodically stop the combine and manually sample and examine the cleaned grain.

In one embodiment, cleaned grain image sensor 238e generates a cleaned grain image signal for transmission to DPU 208. DPU 208 is programmed to distinguish a representation of trash, including fines such as fractured grain kernels, among the cleaned grain kernels, to quantify their presence (e.g., as a trash ratio) to generate an output trash ratio signal, and to display or record the trash ratio signal.

Still referring to FIG. 2, a tailings image sensor 238f at tailings trough 176 is disposed to view tailings flowing to inlet end 152 of thresher 118. The image may be displayed in a CCTV subsystem to allow the operator to visually monitor the flow of tailings and to estimate the amount of grain remaining thereon. The operator can thus change combine settings without having to periodically stop the combine and manually sample and examine the tailings. In one embodiment, tailings image sensor 238f generates a tailings image signal and transmits the signal to DPU 208. DPU 208 distinguishes a representation of grain kernels from the crop materials in the tailings, quantifies the amount of grain (e.g., as a grain:trash ratio) to generate a grain:trash ratio signal, and displays and/or records the grain:trash ratio signal. In another embodiment, DPU 208 is also programmed to distinguish whether the grain kernels observed are loose (i.e., not attached to other crop materials) or are still attached to other crop materials, and to appropriately adjust at least one combine setting control loop (shown generally as a control loop 206 in FIG. 5) setpoint in response.

For example, a presence of too many loose grain kernels in tailings trough 176 may be caused by grain kernels falling off the rear of grain sieve 166, indicating that the size of the openings in grain sieve 166 should be increased to allow more larger grain kernels to fall through the openings into cleaned grain trough 170. The size of openings in grain sieve 166 is adjusted by an actuator (shown generally as actuator 230 in FIG. 5) controlled by a grain sieve opening controller (generally shown as controller 228) which operates in a closed loop (shown generally as control loop 206) based upon a sieve opening size feedback signal from an opening size sensor in response to a sieve opening size setpoint signal received from DPU 208 in response to the tailing image signal.

A presence of too many other crop materials with grain kernels still attached, however, indicates that threshing is not being performed completely enough and that at least one of reducing ground speed, reducing rotor speed, and reducing concave gap 144 must be performed. DPU 208 then adjusts setpoint signals sent to the controllers (shown generally as controller 228 in FIG. 5) of control loops (shown generally as control loop 206 in FIG. 5) for the applicable combine settings, as described above.

Combine 102 may also include a chaffer sieve image sensor 238g located and disposed to view crop material being blown off chaffer sieve 164 by air from cleaning air fan 168. Chaffer sieve image sensor 238g generates a chaffer sieve image signal, and transmits this signal to DPU 208. DPU 208 is programmed to distinguish kernels of grain among the other crop materials represented in the chaffer sieve signal, to quantify their presence (e.g., as a chaffer sieve grain loss rate), and to generate a chaffer sieve grain loss signal corresponding to the grain loss rate. DPU 208 may also be programmed to display and/or record a representation of the chaffer sieve grain loss signal. In one embodiment, DPU 208 is also programmed to correspondingly change a setpoint signal sent to at least one combine 102 setting control loop (shown generally as control loop 206 in FIG. 5) (e.g., chaffer sieve 164 oscillation amplitude and/or frequency, cleaning air fan 168 speed, cleaning air fan 168 outlet restriction, chaffer sieve 164 opening size) in order to reduce the grain loss at chaffer sieve 164 to an acceptably low rate (note that striving for a rate of zero may cause overadjustment of one or more combine settings).

Similarly, combine 102 may also include a grain sieve image sensor 238h located and disposed to view crop material being blown off of grain sieve 166 by air from cleaning air fan 168. The signal from grain sieve image sensor 238h, and its use by DPU 208, are similar to the signal from chaffer sieve image sensor 238g, and its use by DPU 208, except that the controlled parameters include the oscillation amplitude, frequency, and/or the opening size of grain sieve 166 instead of the same parameters of sieve 164.

Figure 3:
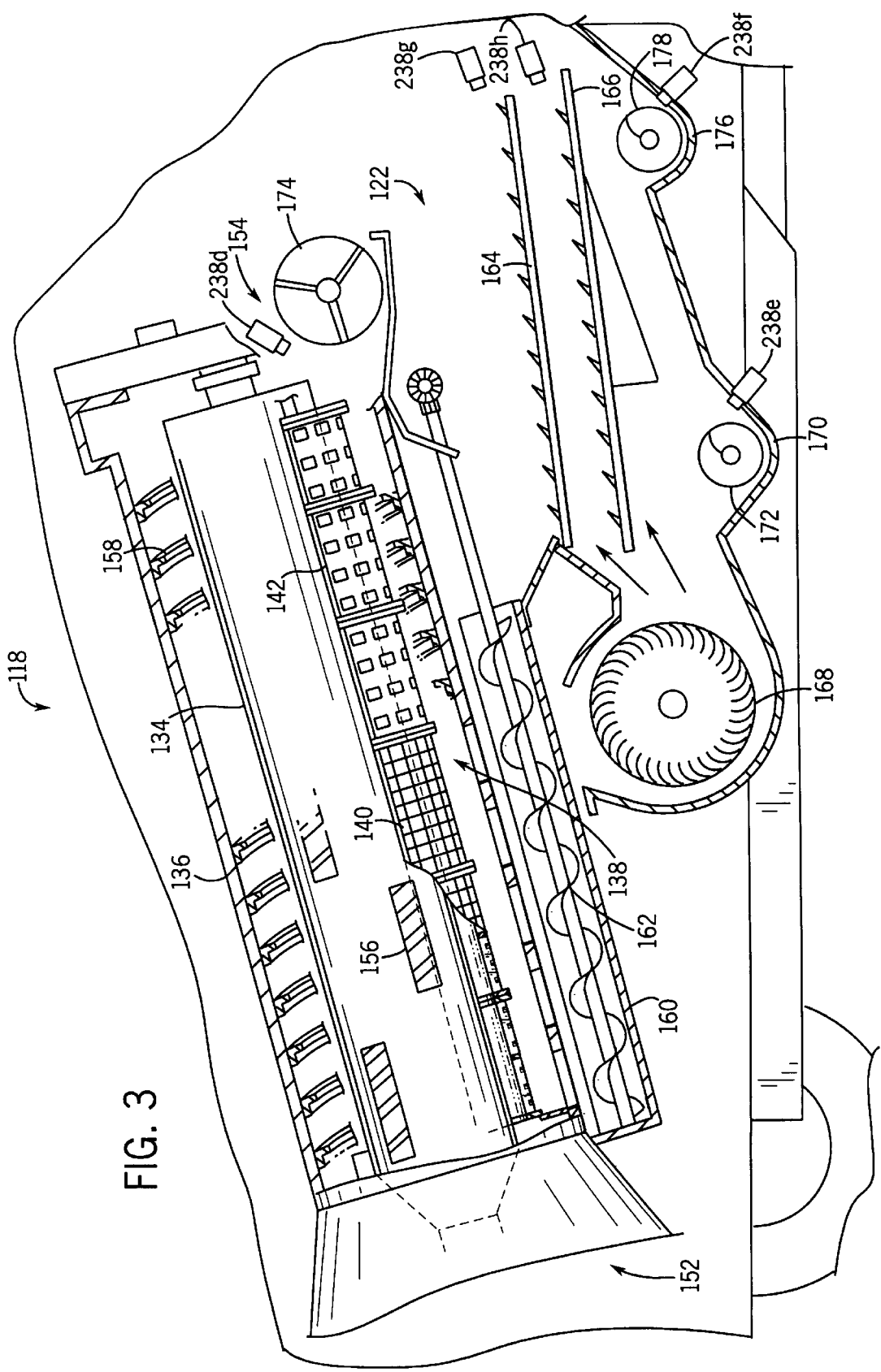
FIG. 3 is an enlarged side elevation view of a portion of the combine.

FIG. 3 is an enlarged view of the cut-away portion of combine 102 in which relationships of parts and assemblies described above are seen more clearly.

FIG. 4 shows concave 138 with parts in exploded relationship. As shown, concave 138 includes three arcuate concave sections 140 and one arcuate grate section 142, although alternative embodiments having more or fewer such sections are equally within the spirit and scope of the present invention. Concave sections 140 have concave apertures 148, and grate sections 142 have grate apertures 150, for the passage of grain kernels freed from other crop materials while threshing. To accommodate various types and conditions of crop by controlling the aggressiveness of the threshing operation, at least concave sections 140 are controllably adjustable in their positions with respect to rotor 134 of thresher 118. As shown, concave sections 140 have arms 180 with recesses 182 for engaging a shaft 188 secured to frame 104. Arms 180 are located upon a first side 184 of each concave section 140, and an actuator engagement member 190 is affixed (e.g., by welding or bolting) to an opposite second side 186 of each concave section 140.

A control loop for setting the concave gap 144 (shown generally as control loop 206 in FIG. 5) includes an actuator (shown generally as actuator 230) between frame 104 and actuator engagement member 190. The length of the actuator (e.g., an hydraulic cylinder or electromechanical leadscrew) is controllably adjustable in response to a signal from a controller (shown generally as controller 228) of the control loop (shown generally as control loop 206) to cause the associated concave section 140 to pivot about shaft 188 and thereby adjust concave gap 144 at at least a portion of each concave section 140.

FIG. 5 shows that instrument and control system 202 includes at least a combine core unit 204 and at least one control loop 206 for a combine process device 232. Within core unit 204, an operator input portion 210 (which includes operator input devices such as selector switches 216, a keypad or keyboard 218, and/or a cursor control 220 such as a mouse or a trackball) is in communication with DPU 208. DPU 208 is also in communication with a controller 228 of control loop 206, and furnishes controller 228 with a setpoint signal for a combine process device 232 setting corresponding to a desired process result (e.g., a concave gap 144 setting which results in substantially complete threshing of crop materials and a low rate of grain loss at outlet end 154 of thresher 118).

Controller 228 varies an output signal applied to an actuator 230 coupled to a combine process device 232 (e.g., concave 138). The status of combine process device 232 (e.g., position of concave 138 with respect to rotor 134) is measured by a combine process sensor 234 (e.g., an LVDT or other displacement sensor), which generates a corresponding status signal and transmits the status signal to controller 228 as feedback. Controller 228, configured to null the difference between setpoint and feedback signals, continues to vary its output signal to actuator 230 until the feedback signal indicates that combine process device 232 is in the position, or other status, required by DPU 208. If combine 102 includes a plurality of combine process device setting control loops (shown generally as control loop 206 in FIG. 5), each loop may have a separate controller 228 or two or more loops may share a multi-channel controller using interrupts or multiplexing.

Instrument and control system 202 includes operator-selectable manual, default, and automatic control modes. The operator selects one of the control modes at operator input portion 210 prior to commencing harvesting operations. Mode selection may be implemented using conventional electrical switches (e.g., three-position rotary, rocker, toggle, etc. switches). Alternatively, mode selection is performed on a keypad associated with a display or on a touch-screen display.

When manual mode is selected, the operator sets various settings for combine process device 232 manually (e.g., feed rate or feeder speed; engine, ground, rotor speeds; a measure of the extent of fracturing of grain kernels during threshing; a ratio of trash to grain in the cleaned grain; grain loss at thresher, chaffer sieve, or grain sieve; tailings flow rate, etc.). Information received from at least one image sensor (e.g., cleaned grain image sensor 238e) and other sensors (e.g., engine, ground, rotor speeds; crop moisture level, etc.) in communication with DPU 208 is transmitted to an operator output portion 212, which includes a display 222 and/or a printer 224. The operator manually makes adjustments to combine process device settings using input devices at operator input portion 210 and information observed in operator output portion 212.

When default or automatic modes are selected, the operator also selects a crop type (e.g., barley, wheat, corn, etc.) at input portion 210. DPU 208 then retrieves setting values for combine process device 232 which are appropriate for the type of crop selected (at typical moisture levels and planting densities) from a look-up table stored in memory apparatus 214, generates corresponding setpoints for combine process device 232, and transmits the setpoints to corresponding controllers 228. When the default mode is selected, the setpoints, and hence the settings of combine process device 232, remain unchanged throughout the course of the harvesting operation in the absence of an intervention by the operator. If the operator wishes to adjust one or more of the settings from their default values (due, e.g., to a higher-than-typical crop moisture level which may make a lower ground speed desirable), he may select manual mode for the particular settings of interest and program the desired new settings at operator input portion 210.

When the automatic mode is selected, along with the appropriate type of crop, the settings are initially adjusted to their default values, as in default mode, at the commencement of harvesting. During the harvesting operation, however, the settings are continuously and automatically optimized in response to signals received by DPU 208 from image sensors 238 and other sensors 240. DPU 208 adjusts setpoints in response to the signals received from these sensors, and transmits the setpoints to controllers 228.

DPU 208 is programmed by software stored in memory apparatus 214 to serve as the controller of other, supervisory control loops configured for determining the setpoints for the control loops 206 of the subordinate combine process devices 232. DPU 208 determines the setpoint signal transmitted to controller 228 in response to information received from image sensor 238 and/or other sensor 240 by comparing that information with a command (regarding, e.g., combine throughput rate, grain individual and bulk qualities, grain loss rates, etc.) received by DPU 208 from memory apparatus 214.

In one embodiment, a portable memory device of apparatus 214 is preprogrammed with harvest commands to be applied uniformly to the entire field. In another embodiment, when wireless communication with remote computer 236 is not available, apparatus 214 is preprogrammed with locationally varied harvest commands correlated with corresponding locational data in a GIS database stored in remote computer 236. To use GIS precision data, instrument and control system 202 has a GPS/DGPS receiver 226 and antenna 130 in communication with DPU 208.

When wireless communication with remote computer 236 is available, DPU 208 receives GIS precision farming data (i.e., locationally varied harvest commands correlated with corresponding GPS/DGPS locational data) substantially in real time from remote computer 236 via a wireless datalink. Instrument and control system 202 may also be configured for feed-forward, or anticipatory, control wherein the setpoint data corresponds to a particular position located ahead of combine 102 by a look-ahead distance corresponding to the ground speed of combine 102 and to the throughput time of at least thresher 118 (i.e., time required for the crop material within combine 102 to be processed through thresher 118), which is generally an approximately linear function of the rotational speed of rotor 134. The look-ahead distance may correspond instead to a moving average of recent ground speeds of combine 102 and to rotor 134 speeds.

In one embodiment, combine core unit 204 is an easily removed and replaced apparatus having plug-in power and data bus connections for ease of service, repair, and upgrade, and to allow its use as needed in various combines within a fleet. In another embodiment, operator input portion 210 is at least partially integrated with display 222 of output portion 212 by configuring display 222 with a touch-screen overlay of keypad, alphanumeric indicia, and/or graphic indicia for operator inputs.

The following paragraphs presents several examples of the manner in which settings of the crop processing devices are adjusted by instrument and control system 202 in response to crop image signals generated by machine vision apparatus 238. Of course, many other adjustments may be possible and desirable, and may be determined based upon empirical testing or in-the-field harvesting experience.

In one example, the machine vision apparatus is disposed to view incoming crop material at the feeder and to generate an incoming crop image signal, for application to DPU 208. In response, DPU 208 analyzes the incoming crop image signal to determine the delivery rate of the incoming crop material (i.e., feed rate). Based upon the feed rate, the instrument and control system may be configured to control any or all of the ground speed, rotor speed, reel speed, feeder speed, and engine speed. For example, ground speed may be increased and one or more of rotor speed, reel speed, feeder speed and engine speed may be decreased when the feed rate is less than a first predetermined feed rate. These settings may be adjusted in the opposite direction when the feed rate is above a second predetermined feed rate.

In another example, the machine vision apparatus is disposed to view the grain after it has been threshed and cleaned to generate a threshed grain image signal. In response, DPU 208 distinguishes patterns within the threshed grain image signal indicative of the quality of the grain. For example, the DPU can be configured to distinguish fractured kernels from among the threshed and cleaned grain kernels, and to determine the proportion of the fractured kernels from among the total kernels, which is inversely proportional to quality (i.e., a large number of fractured kernels is indicative of low quality grain). The quality can also be determined by detecting the amount of material other than whole kernels (i.e., the amount of trash) within the threshed and cleaned grain. Based upon the quality level, the instrument and control system controls the settings of various crop processing systems. For example, the DPU can control concave gap in response to the proportion of fractured grain (e.g., increase the gap in response to a high proportion of fractured kernels; reduce the gap in response to a low proportion of fractured kernels). For another example, the DPU can control the speed of the cleaning air fan in response to the amount of trash in the threshed grain (e.g., increase the cleaning air fan speed in response to large amounts of trash; decrease the cleaning air fan speed in response to small amount of trash). The quality data can also be displayed, printed or recorded in the memory apparatus.

Although this description focuses on adjusting certain crop processing features of combine 102, other features may also be adjusted at least in part based on parameters sensed by crop material image sensor 238. For example, other adjustable features are described in U.S. patent application Ser. No. 08/892,789, filed on Jul. 15, 1997 by Watt et al., and assigned to the assignee of the present application. Such features are also described in U.S. Pat. No. 5,666,793, issued Sep. 16, 1997 to Bottinger. Both the '789 application and '793 patent are incorporated herein by reference.

While the embodiments illustrated in the Figures and described above are presently preferred, is should be understood that these embodiments are offered only as examples. For further example, the various augurs described may instead be belt conveyors or other conveyors. The particular manner in which crop processing devices are adjusted based upon crop image signals may differ. Also, other reaping, threshing, or cleaning apparatus may be substituted while remaining within the scope and spirit of the invention. Other variations of construction rather than invention will be obvious to those skilled in the art. The invention is not intended to be limited to any particular embodiment, but is intended to encompass various modifications and differences of construction falling within the scope and spirit of the appended claims.

What is claimed is:

1. An agricultural combine for processing crop materials, the combine including a frame, a main body supported by the frame, and ground support devices for supporting the frame upon a surface of a field, the combine comprising:

a propulsion system to propel the combine at a ground speed;

a header to gather crop materials from the field, the header including a reel member rotatable at a reel speed;

a feeder to convey the crop materials from the header to the main body, the feeder including a conveyor moveable at a feeder speed;

a thresher supported by the main body for receiving the crop materials from the feeder and separating useable grain therefrom, the thresher including a rotor spaced apart from a concave by a concave gap, the rotor rotatable at a rotor speed;

a cleaning portion for cleaning the useable grain, the cleaning portion including a cleaning air fan rotatable at a fan speed, and also including a chaffer sieve and a grain sieve, each chaffer sieve and grain sieve having at least one aperture; and an instrument and control system for monitoring conditions of processing of the gathered crop materials and automatically adjusting settings of the combine in response to the monitored conditions, the including:

a machine vision apparatus disposed to view the crop materials being processed by the combine and to generate a crop image signal representative thereof;

an actuator for adjusting one of the ground speed, reel speed, feeder speed, rotor speed, fan speed and concave gap in response to a control signal; and a data processing unit (DPU) coupled to the machine vision apparatus and the actuator, the DPU configured to execute a control program to generate the control signal based at least in part on the crop image signal and to apply the control signal to the actuator, the actuator controlled at least in part by the crop image signal.

2. The combine of claim 1 wherein the machine vision apparatus includes an image sensor for viewing the crop materials at one of a part of the field in front of the header, the header, and the feeder, the crop image signal is a spectral color signal representing hue of the crop materials, and the DPU chromatically analyzes the spectral color signal such that the control signal depends on the hue.

3. The combine of claim 2 wherein the DPU compares the spectral color signal to a register of color data stored in a memory apparatus corresponding to at least one constituent level within the crop material, and the instrument and control system is configured to generate a constituent level signal corresponding to a level of the constituent and to cause one of displaying the constituent level, printing the constituent level, and recording the constituent level in the memory apparatus.

4. The combine of claim 2 wherein the image sensor is configured to detect light in a near-infrared spectrum of wavelengths.

5. The combine of claim 1, wherein the machine vision apparatus includes an image sensor disposed to view the crop material being conveyed at the feeder, and the DPU determines a feed rate for the crop material by analyzing the crop image signal generated by the image sensor in response to the crop material being conveyed and generates the control signal based at least in part on the feed rate.

6. The combine of claim 5, wherein the instrument and control system includes a mode selector device and an operator input device coupled to the DPU, the mode selector device has manual, automatic and default settings, and the feed rate is manually set by the operator input device when the selector device is in the manual setting, depends on the crop image signal when the selector device is in the automatic setting, and is set to a default value when the selector device is in the default setting.

7. The combine of claim 1 wherein the machine vision apparatus includes an image sensor disposed to view the useable grain, generate a useable grain image signal, and transmit the useable grain image signal to the DPU, the DPU also configured to distinguish patterns in the useable grain image signal indicative of the quality of the grain, and to cause at least one of displaying the quality, printing the quality, recording the quality, and generating the control signal to affect the quality.

8. The combine of claim 7 wherein the quality of the useable grain represents the degree to which fracturing is absent in the threshed grain kernels.

9. The combine of claim 8, wherein the DPU generates the control signal to increase and to decrease the concave gap in response to relatively high and relatively low levels of fractured threshed grain kernels, respectively.

10. The combine of claim 9, wherein the instrument and control system includes mode selector and operator input devices coupled to the DPU, the mode selector device has manual, automatic and default settings, wherein the quality is manually set by the operator input device when the selector device is in the manual setting, depends on the crop image signal when the selector device is in the automatic setting, and is set to a default value when the selector device is in the default setting.

11. The combine of claim 7 wherein the quality of the useable grain represents the degree to which material other than whole grain kernels is present with the useable grain.

12. The combine of claim 1 wherein the machine vision apparatus includes an image sensor for viewing cleaned grain kernels, generates a cleaned grain kernel spectral color signal representing hue of the cleaned grain kernels which is transmitted to the DPU for chromatic analysis of the cleaned grain kernel spectral color signal so that the control signal depends on the hue of the cleaned grain kernels.

13. The combine of claim 12 wherein the DPU compares the spectral color signal to a register of color data stored in a memory apparatus, the stored color data corresponding to at least one constituent level within the cleaned grain kernels, and the instrument and control system generates a constituent level signal corresponding to a level of the constituent and causes one of displaying the constituent level, printing the constituent level, and recording the constituent level.

14. The combine of claim 1 wherein the instrument and control system includes a sensor for measuring a flow rate of processed grain kernels to generate a yield signal, and the machine vision apparatus includes an image sensor disposed to view trash output of at least one of the rotor, the chaffer sieve and the grain sieve, and to generate a trash image signal representative thereof, and the DPU is configured to distinguish the presence of whole grain kernels among the trash output and to quantify the flow rate of grain kernels among the trash output, to generate a grain loss rate signal representing the flow rate of grain kernels in the trash output, to compute a ratio of grain loss rate to yield, and to generate the control signal based at least in part on the computed ratio of grain loss rate to yield.

15. The combine of claim 1 wherein the instrument and control system includes a Differential Global Position System (DGPS) receiver system to receive location signals, and is further configured to store data representative of the adjustment made by the actuator correlated with the location signals.

16. The combine of claim 1 further comprising a tailings conveyor for conveying tailings to the thresher, the machine vision apparatus including an image sensor disposed to view the tailings and to generate a tailings flow rate signal representative thereof, and the DPU is configured to generate the control signal at least partly in response to the tailings flow rate signal.

17. An instrument and control system for an agricultural combine, the combine having a frame, a main body supported by the frame, ground support devices for supporting the frame upon a surface of a field, and a plurality of crop processing systems for gathering, processing and cleaning crop materials being grown upon the field, at least one of the crop processing systems having a setting adjustable in response to a control signal, the instrument and control system comprising:

a machine vision apparatus disposed to view the crop materials being processed by the combine and to generate a crop image signal representative thereof;

an actuator configured to adjust the setting of the at least one crop processing system in response to the control signal;

a memory apparatus configured to store at least a control program; and a data processing unit (DPU) coupled to the machine vision apparatus, the actuator, and the memory apparatus, the DPU configured to execute the control program, wherein the DPU is instructed to generate the control signal based at least in part on the crop image signal and to apply the control signal to the actuator so that the actuator is controlled at least in part based upon the crop image signal.

18. The instrument and control system of claim 17 wherein the machine vision apparatus includes an image sensor for viewing the crop materials and generating a spectral color signal representing hue of the crop materials, and the DPU chromatically analyzes the spectral color signal in generating the control signal.

19. The instrument and control system of claim 18 wherein the DPU compares the spectral color signal to a register of color data also stored in the memory apparatus to select one of the color data most closely matching the crop hue.

20. The instrument and control system of claim 18 wherein the image sensor is configured to detect light in a near-infrared spectrum of wavelengths.

21. The instrument and control system of claim 17 wherein the crop processing system includes a header for gathering the crop materials from the field, the header including a reel rotatable at a reel speed adjustable by the control signal.

22. The instrument and control system of claim 21 wherein the machine vision apparatus is disposed to view the crop materials being gathered by the header.

23. The instrument and control system of claim 17 wherein the crop processing system includes a feeder for conveying crop materials from a header to the main body, the feeder including a conveyor moveable at a feeder speed adjustable by the control signal.

24. The instrument and control system of claim 23 wherein the machine vision apparatus is disposed to view the crop materials being conveyed by the feeder.

25. The instrument and control system of claim 17 wherein the crop processing system includes a thresher for receiving crop materials from a feeder and for separating useable grain therefrom, the thresher including a rotor spaced from a concave by a gap, the rotor rotatable at a rotor speed adjustable by the control signal.

26. The instrument and control system of claim 25 wherein the machine vision apparatus is disposed to view the useable grain separated by the thresher.

27. The instrument and control system of claim 26 wherein the concave gap is adjustable by a second control signal, and the DPU also generates the second control signal based at least in part on the crop image signal and to apply the second control signal to a second actuator configured to adjust the concave gap.

28. The instrument and control system of claim 17 wherein the crop processing system includes a cleaning portion for cleaning useable grain, the cleaning portion including an air fan rotatable at a fan speed adjustable by the control signal.

29. The instrument and control system of claim 28 wherein the machine vision apparatus is disposed to view the cleaned useable grain.

30. The instrument and control system of claim 17 also comprising a Differential Global Position System (DGPS) receiver system to receive location signals, the DPU further configured to store data representative of the adjustment made by the actuator correlated with the location signals in the memory apparatus.

31. A method of controlling operation of an agricultural combine provided with an instrument and control system, and including a frame, a main body supported by the frame, ground support devices for supporting the frame on a surface of a field, and a plurality of crop processing devices for gathering, processing and cleaning crop materials being grown on the field, at least one of the crop processing devices having a setting adjustable in response to a control signal, comprising:

(a) viewing an image of crop materials processed by the combine using machine vision and generating a crop image signal representative thereof;

(b) transmitting the crop image signal to a DPU;

(c) comparing the crop image signal with a setpoint and generating an output signal based on a relationship between the image and setpoint signals; and (d) applying the output signal to an actuator configured to adjust the setting of the at least one crop processing devices.

* * * * *